United States Patent [19]
Erkfritz

[11] 3,708,843
[45] Jan. 9, 1973

[54] HOLDER FOR INDEXABLE CUTTING INSERT

[75] Inventor: Donald A. Erkfritz, Rockford, Ill.

[73] Assignee: The Ingersoll Milling Machine Company, Rockford, Ill.

[22] Filed: Nov. 5, 1971

[21] Appl. No.: 196,149

Related U.S. Application Data

[62] Division of Ser. No. 17,605, March 9, 1970, Pat. No. 3,662,444.

[52] U.S. Cl. ................................................29/105 A
[51] Int. Cl. ..............................................B26d 1/12
[58] Field of Search...........29/96, 97, 98, 105, 105 A

[56] References Cited

UNITED STATES PATENTS

| | | | |
|---|---|---|---|
| 3,195,376 | 7/1965 | Bader | 29/105 |
| 3,104,453 | 9/1963 | Greenleaf | 29/105 A |
| 3,315,332 | 4/1967 | Lowry et al. | 29/105 |
| 3,200,474 | 8/1965 | Kralowetz | 29/105 |
| 2,838,827 | 6/1958 | Wright | 29/96 |
| 3,339,257 | 9/1967 | Hargreaves et al. | 29/105 A |
| 3,138,847 | 6/1964 | Berry, Jr. | 29/96 |
| 3,217,384 | 11/1965 | Wirfelt | 29/105 A |
| 3,391,438 | 7/1968 | Milewski | 29/105 A |
| 3,299,491 | 1/1967 | Hall | 29/96 |

*Primary Examiner*—Harrison L. Hinson
*Attorney*—Wolfe, Hubbard, Leydig, Voit & Osann, Ltd.

[57] ABSTRACT

A flat and centrally apertured wafer-like insert of cutting material provides a plurality of angularly spaced available cutting tips and is located edgewise against angularly related abutments upstanding from the inner edge of a supporting surface or platform against which the insert is clamped in the final seating in a conical end of the insert aperture of the mating conical head of a screw extending through the insert aperture and threading into a hole in the platform. In one embodiment, one of the locating abutments is defined by the inclined surface of a wedge which may be threaded into and out of the body to adjust the edgewise position of the insert. In another embodiment, one of the locating abutments is on a plate formed separately of and spot welded to the body and capable of being removed and replaced if damaged during service use of the cutter.

5 Claims, 9 Drawing Figures

PATENTED JAN 9 1973

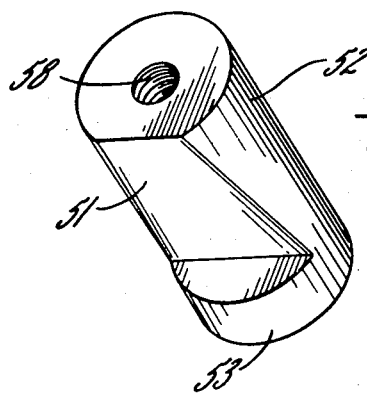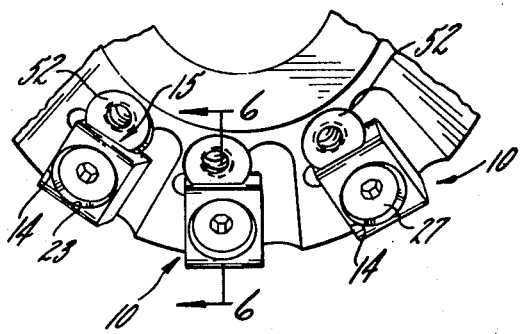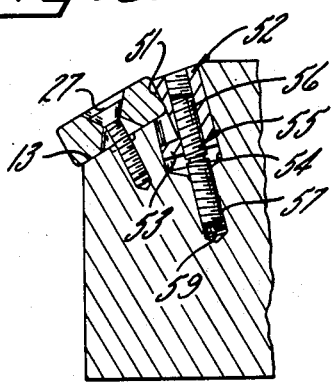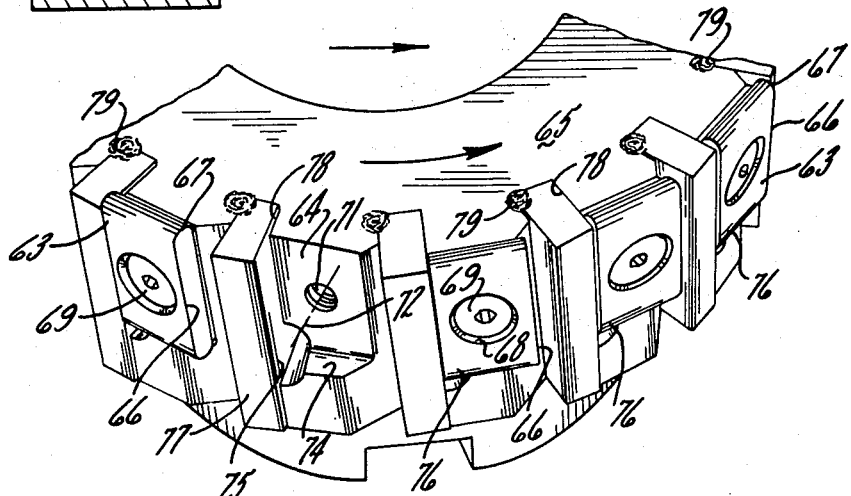

HOLDER FOR INDEXABLE CUTTING INSERT

CROSS-REFERENCE TO A RELATED APPLICATION

This application is a division of my copending application Ser. No. 17,605, filed Mar. 9, 1970, now U.S. Pat. No. 3,662,444.

BACKGROUND OF THE INVENTION

This invention relates to the clamping to and the edgewise location on a supporting surface of an indexable insert of cutting material by means of a fastener extending through an aperture in the insert and acting, during final tightening of the fastener, to cam and press the insert edgewise against a locating abutment upstanding from the platform, a cutting edge of the indexable insert being then left overhanging the platform for cutting engagement with a workpiece.

SUMMARY OF THE INVENTION

One of the aims of the present invention is to provide a cutter with new and improved insert locating abutments which facilitate precise location of the inserts while being removable and replaceable in case of damage.

Another objective is to provide for limited adjustment of at least one of the insert locating abutments in order to achieve optimum precision in locating the several active cutting edges of the inserts in multi-blade cutters.

Still another object is to form at least one of the insert locating abutments separately of the cutter body and to spot weld the abutment to the body in order to anchor the abutment rigidly to the body while enabling comparatively easy removal and replacement of the abutment if the latter becomes damaged during service use.

These and other objects and advantages of the invention will become more apparent from the following detailed description when taken in conjunction with the accompanying drawings.

BRIEF DESCRIPTION OF THE DRAWINGS

FIG. 5 is a fragmentary perspective view similar to FIG. 1 but showing a modified cutter with a locating abutment in accordance with the present invention.

FIG. 6 is a fragmentary section taken along the line 6—6 of FIG. 5.

FIGS. 7 and 8 are perspective views of parts of the cutter shown in FIG. 5.

FIG. 9 is a fragmentary perspective view of a combined slab and face milling cutter incorporating modified insert locating abutments constructed in accordance with the present invention.

DETAILED DESCRIPTION OF THE PREFERRED EMBODIMENTS

Figure 1:
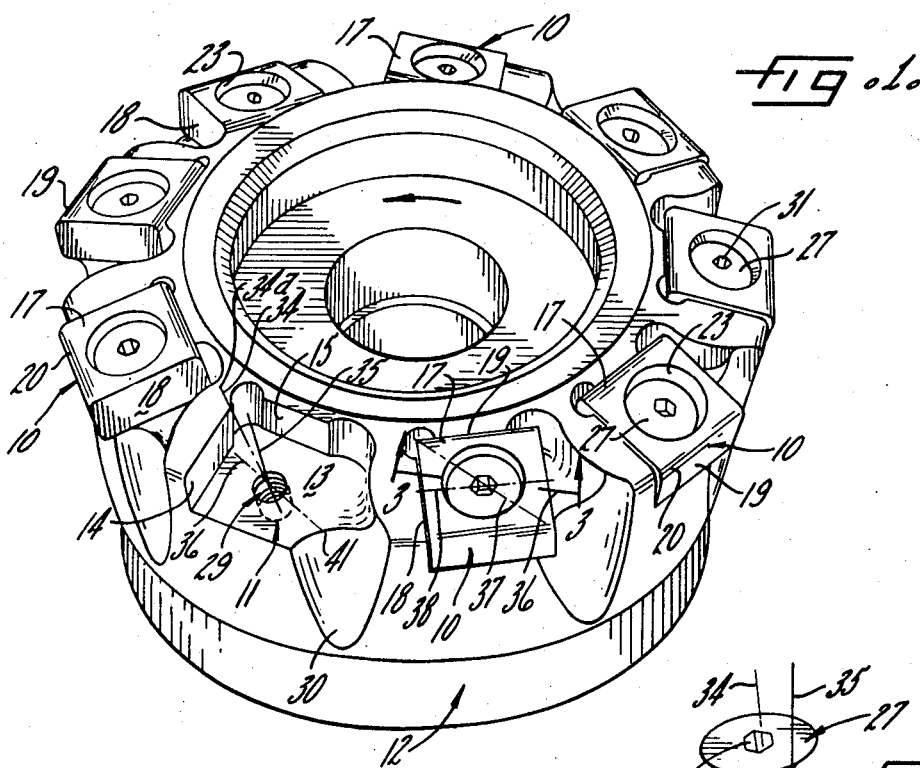
FIG. 1 is a perspective view of a cylinder boring cutting having indexable inserts fastened to the body.
Figure 2:
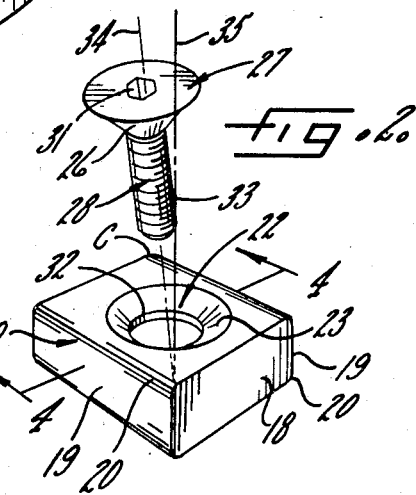
FIG. 2 is an exploded perspective view of one of the inserts and its fastening screw.

While the invention may be used to advantage in securing indexable inserts of cutting material in various types of cutter bodies to provide a number of available cutting edges without resharpening, one aspect of the invention will be described herein as embodied in a multiple blade boring cutter.

Referring then to FIGS. 1 to 4, a plurality of flat, wafer-like blades or inserts 10 of suitable cutting material such as tungsten carbide are seated in pockets 11 equally and angularly spaced around the end of a body 12 centrally apertured for mounting on the end of a spindle (not shown) and adapted to be power rotated as indicated by the arrow and fed axially to effect the boring or enlargement of a hole in a workpiece. Each of the pockets 11 is defined by a flat bottom surface or platform 13 and by abutments 14 and 15 upstanding from the trailing and inner edges of the platform whose leading and outer corner 41 terminates at a chip receiving recess 30. For use with the square ended inserts shown, the abutments 14 and 15 are preferably disposed at right angles to the platform 13 and angularly related to define a corner for receiving and locating one corner of the insert and so spaced inwardly from the periphery of the body that the diagonally opposite corner of the insert will overhang the leading edge of the platform and part of the chip recess 30. The overhanging corner is thus adapted for cutting engagement with the workpiece to be machined.

In the boring cutter illustrated, each insert 10 comprises a square block of cutting material with parallel side faces 17 and opposite parallel ends 18 which are flat and perpendicular to the side faces. The other straight and parallel ends 19 have opposite side edges 20 which may be beveled or rounded as shown and separated by flat surfaces 21 narrower than the overall thickness of the wafer.

Each insert 10 is formed with a center hole 22 recessed at both ends in the present instance to form frusto-conical seats 23 and 24 whose axes 25 coincide and are disposed precisely perpendicular to the plane of the insert. The cone angle of the seats, 60° in the form shown, is the same as that of the underside 26 of the flat head 27 of a standard screw 28 adapted to extend through the insert hole 22, thread into a mating hole 29 in the body 12 at the center of the platform 13, and, in the final tightening of the screw, clamp the insert against the platform with edges 18 and 19 of the insert in solid engagement with both of the abutments 14 and 15. Such tightening is effected by a tool engageable in an exposed center recess 31 in the screw head.

The cone angle of the screw head surface 26 is the same as that of the surfaces of the recesses 23 and 24, the minimum diameter 32 of the insert hole being somewhat greater than the outside diameter of the screw shank 33, and the upper end 34a of the axis 34 of the screw hole 29 is inclined at a small angle, preferably on the order of 1.5° to 5°, relative to the axis 25 of the conical recesses 23 and 24 and toward the corner defined by the abutments 14, 15. This angle, indicated at X in FIG. 3, is such that in the final tightening of the screw after engagement of one corner of the insert against the abutments 14 and 15, the shank 33 of the screw will bend laterally to allow the screw head 27 to come into full surface engagement with the seat substantially around the full periphery of the surface of the outer recess 23 as shown in FIG. 3.

It will be observed that with the insert hole 22 sized and shaped as above described relative to the diameter of the screw shank 33, a substantial length of the latter will be unsupported at the time when the screw head surface 26 first engages the insert on the side of the recess 23 nearest the abutment corner. Thus, this length of the screw shank, usually about 1 to 3 times the diameter of the shank, is free to bend laterally as the screw is threaded further into the hole. It has been found in practice that with a standard steel screw having a shank diameter of 0.187 of an inch, the required lateral bending to allow full seating of the screw head (FIG. 3) may be achieved without danger of stressing the steel above its elastic limit. If desired, the bending may be facilitated and the stressing reduced by countersinking the upper end of the screw hole as indicated in dot-dash outline in FIG. 3.

To achieve the lateral bending, the screw hole is formed in the platform 13 with its axis 34 tilted within a generally upright diametrical plane 36 (FIG. 1) extending transversely of the insert and platform and disposed between a plane 37 bisecting the corner defined by the abutments 14, 15 and a plane 38 extending through the insert axis and perpendicular to the trailing abutment 14. In the tilting, the upper end 34a of the screw hole axis 34 is moved toward the abutment 14 and away from the axis 35 of the insert recess 23. Preferably, the screw hole axis is inclined at from about 1.5° to 5° relative to the insert axis 35 and desirably is positioned to intersect the axis of the located insert approximately at a point 39 in the plane of the platform 13 as shown in FIG. 3.

Figure 3:
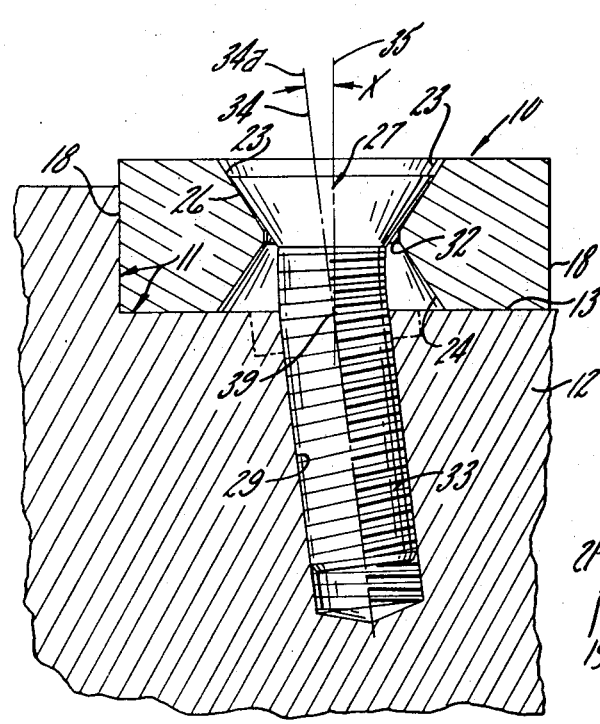
FIG. 3 is a fragmentary section taken along the line 3—3 of FIG. 1.
Figure 4:
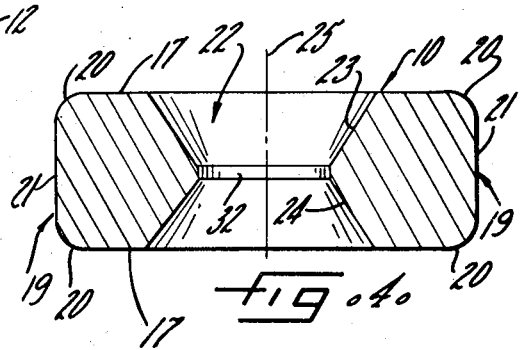
FIG. 4 is a section taken along the line 4—4 of FIG. 2.

With the screw and insert axes 34 and 35 located as above described, the bending of the screw shank 33 in the fastening of an insert 10 on its platform 13 is illustrated on a somewhat exaggerated scale in FIG. 3. First, the insert is placed on the platform 13 with one corner defining the desired cutting tip exposed beyond the platform and the diagonally opposite corner engaging the abutments 14 and 15. Next, the screw shank 33 is projected through the insert hole as permitted by the ample clearance at 32 and threading into the hole is started. As the shank is screwed into the hole, the side of the conical head surface 26 nearest the abutment 14 first engages the conical surface 23 of the insert on the side thereof nearest the abutment 14.

As the turning of the screw in the tightening direction is continued and the screw head is drawn further into the recess 23, the first engaged side thereof acts against the head surface 26 to cam the screw head laterally away from the abutment 14 allowing the head to advance further into the recess 23. Such further entry of the screw head is permitted by lateral bending of the unsupported length of the screw shank 33 within the clearance at 32 around the hole of the insert. The bending continues until the head has become fully seated and in engagement around substantially the full periphery of the screw head as illustrated in FIG. 3.

With the screw hole axis 34 tilted in the plane 36 as above described, it will be apparent that the insert 10 will be crowded edgewise of the platform 13 and toward the abutment corner by a resultant force whose component directed toward the trailing abutment 14 is somewhat greater than the component directed toward the inner abutment 15. Since the resultant force acts along the plane 36, the insert will be held securely against the locating abutments 14, 15 and, by virtue of such full peripheral surface seating, will be clamped and held much more securely on the platform than has been possible with the screw clamps heretofore used. The insert may be removed easily from the platform for replacement or for indexing or inversion to present a new cutting tip into cutting position when a previously used tip becomes worn.

In multiple bladed cutters adapted for finishing operations, it is desirable to provide for great precision in the radial or axial location of the active cutting edges and this, without the necessity of employing precisely dimensioned and more costly inserts. The present invention, in one of its aspects, contemplates mounting one of the holder corners defining the insert locating abutments for limited adjustment transversely of the supporting platform and in the direction of the active cutting tip.

In the present instance, this is accomplished by making the inner locating abutment 15, in the case of a boring cutter of the type shown in FIG. 1, in the form of a surface 51 (FIG. 6) mounted on the cutter body 12 in a plane inclined relative to the associated platform 13 and adapted for accurate adjustment transversely of the platform. Preferably, the inclined surface 51 is the inner face of a wedge 52 (FIGS. 5 to 7) having a circular cross-section 53 at one end slidable in a cylindrical bore 54 extending into the cutter body adjacent the inner edge of the platform 13 and at an angle such as to adjust the abutment 51 broadwise as the wedge is advanced into and out of the body.

Herein, such adjustment of the wedge is effected by a screw 55 (FIGS. 6 and 8) having oppositely threaded end portions 56 and 57 respectively threaded in a hole 58 extending longitudinally through the wedge and a hole 59 extending into the cutter body at the bottom of the wedge recess 54. By inserting a suitable tool in a recess 61 in the outer end of the screw, the latter may be turned in opposite directions to advance the wedge into and out of the cutter body and thus adjust the radial position of the abutment 15 defined by the side 51 of the wedge. By such adjustment of the wedge of the different inserts while the latter are engaging their respective abutments 14 and 15, the wedges may be positioned to shift the inserts edgewise and outwardly and thereby locate the active cutting tips in precisely the same positions radially of the cutter body.

The improved security achieved in locating and clamping indexable inserts as described above may be utilized with equal advantage in tool holders for use in various other types of machining. As an example, FIG. 9 shows a multi-blade cutter having indexable inserts 63 clamped against platforms 64 spaced around the periphery of a rotary body 65 and presenting, in each of the available positions of each insert, cutting edges 66 adapted, during rotation and bodily feeding of the cutter as indicated by the arrows, for so-called slab milling of a flat surface and edges 67 for simultaneously face milling a surface angularly disposed, for example at right angles, to the slab milled surface.

As before, the inserts 63 are centrally apertured and formed with frusto-conical recesses 68 for receiving the heads 69 of standard screws adapted to thread into holes 71 having axes 72 inclined relative to the platforms 64 and toward abutments 74 in the same manner and at the same angles as the axes 34 above described. Abutments 75 extending along the trailing sides of the platforms cooperate with the abutments 74 to define the corners into which corners 76 of the inserts 63 are crowded by tightening of the screws to bend the screw shanks in the same manner as in the boring cutter described above.

In furtherance of the invention, the abutments 75 are formed by the leading face of separately formed plates 77 disposed in slots 78 in the body 65 with opposite ends secured to the body as by spot welds 79. Such formation of the abutments 75 is advantageous in that, in the event of breaking of the cutter in service use, the plates 77 are the parts most likely to be damaged. Any damaged plate 77 may be removed from the body 65 by breaking the spot weld, thereby providing for rebuilding of the cutter at minimum cost. It will be apparent that the plates 77 shown in FIG. 9 and the wedge 52 shown in FIGS. 5 to 7 may be used in the same cutter, the plate forming one locating abutment for the insert and the wedge forming the other locating abutment.

I claim as my invention:

1. A tool holder for an indexable insert of cutting material having a plurality of cutting edges spaced from and around an aperture through the insert, a body including a platform rigid therewith supporting said insert, angularly related abutments upstanding from the platform and defining a corner into which said insert may be pressed edgewise to locate one of said edges in cutting position, one of said abutments comprising a member having a flat and planar wedge surface positioned for face-to-face engagement with one edge of said insert, means on said body for supporting said member for movement into and out of said holder body to adjust said wedge surface transversely of said platform and thereby vary the edgewise position of the insert and cutting edge then in active cutting position, said flat wedge surface remaining in face-to-face engagement with said one edge of said insert in all adjusted positions of said member, and means on said body selectively operable to engage said insert and clamp the same to said platform with the insert pressed edgewise into said abutment corner.

2. A tool holder as defined in claim 1 in which said means for supporting said member comprises a screw having one end threading into said body and the other end threading into a hole extending into said member along the line of adjustment thereof relative to said body.

3. A tool holder as defined in claim 2 in which the threads on opposite end portions of said adjusting screw are of opposite hands whereby said member is displaced in opposite directions relative to said body by turning the screw in opposite directions.

4. A rotary tool holder for an indexable cutting insert of cutting material, said insert comprising a block having comparatively wide face surfaces and narrower edge surfaces, cutting edges formed at least at some of the junctions of said face surfaces with said edge surfaces, an aperture extending through said block from one of said face surfaces to the other of the face surfaces, said tool holder comprising a body having an integral platform supporting said insert with one of said face surfaces resting on said platform and with one of said narrow edge surfaces facing the direction of rotation of said holder, a fastener extending through said aperture and threaded into said platform, angularly related abutments upstanding from the platform and defining a corner into which said insert is pressed edgewise by said fastener to locate one of said cutting edges in cutting position, one of said abutments engaging the trailing edge surface of said insert during rotation of said body and comprising a plate formed separately of both said platform and said other abutment and spot welded to said body.

5. A tool holder as defined in claim 4 in which one part of said abutment plate is disposed and held in a notch on said body and another part is tack welded to the body.

* * * * *